Jan. 21, 1969  A. KALLERT ET AL  3,423,271
CUTTING OF THERMOPLASTIC FABRICS
Filed July 21, 1966
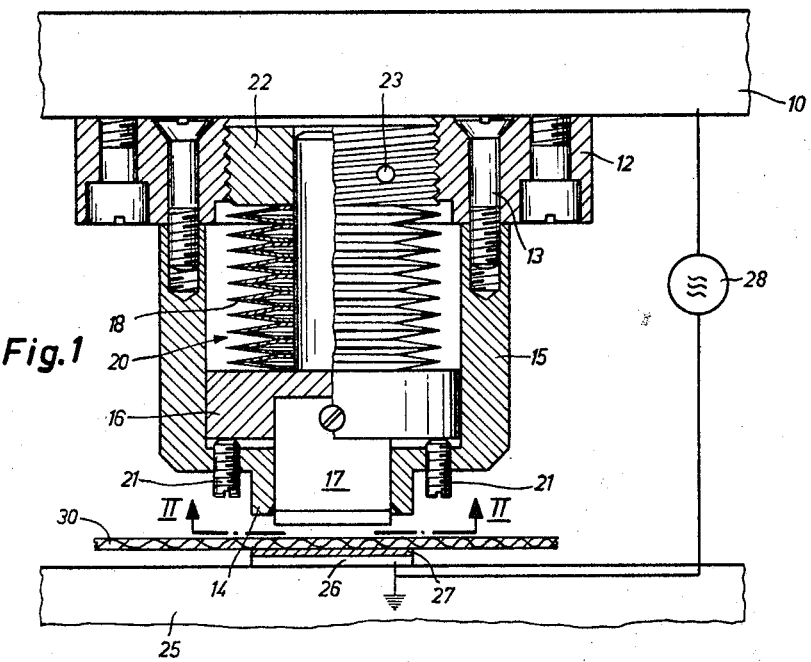
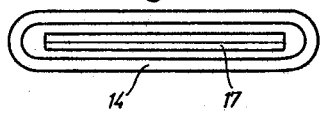
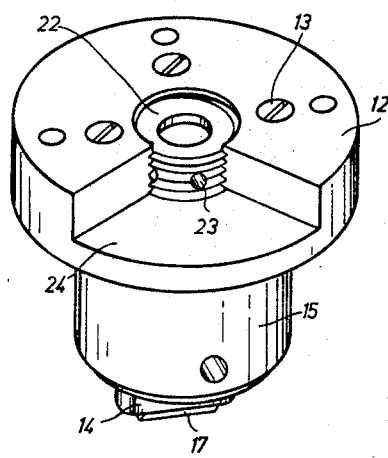
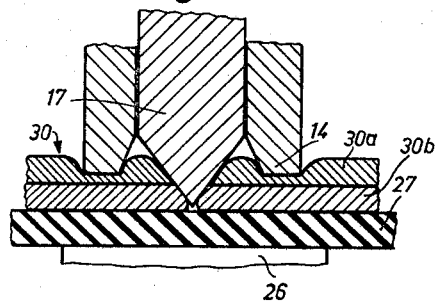
INVENTORS
ALFRED KALLERT &
KONRAD RASCHER
BY
KARL RATH
ATTORNEY

United States Patent Office 3,423,271
Patented Jan. 21, 1969

3,423,271
CUTTING OF THERMOPLASTIC FABRICS
Alfred Kallert and Konrad Rascher, Nuremberg, Germany, assignors to G. M. Pfaff AG, Kaiserslautern, Pfalz, Germany, a corporation of Germany
Filed July 21, 1966, Ser. No. 566,873
Claims priority, application Germany, Aug. 17, 1965, P 37,468
U.S. Cl. 156—380                                    7 Claims
Int. Cl. B32b 31/18

The present invention relates to the cutting of thermoplastic fabric workpieces, or workpieces of woven, knitted, felted, etc. fabrics composed at least in part of thermoplastic fibres, and more particularly, though not limitatively, to the production of buttonholes or the like in a fabric workpiece of this type.

It is already known in the production of buttonholes in workpieces consisting of synthetic thermoplastic material to utilize a welding electrode provided with a projection forming a knife edge or cutter, to effect, by means of a single operating step, heating and softening the material and to cut the workpiece, or layers of superposed workpieces, to produce a buttonhole, while at the same time welding together the superposed workpieces. Satisfactory results may be achieved in this manner in the cutting of foil or the like thermoplastic workpieces or materials.

On the other hand, difficulties have been encountered in the cutting of fabrics composed at least in part of thermoplastic fibres, due to the free or unwelded ends of the fibres being left along the edges of the buttonhole and liable to cause fraying or unraveling, or to reduce the stability and durability of the buttonhole, aside from impairing its appearance and other defects well understood.

Accordingly, an important object of the present invention is the provision of improved method and cutting apparatus of the referred to type, especially for the production of buttonholes in fabrics composed at least in part of thermoplastic fibres, said method and apparatus being substantially devoid of the prior and related difficulties and defects by the production, in a single operating step, of both a welding joint between the fibres over an area adjoining the cut to be produced and subsequent cutting of the welded area, while still in plastic condition, to result in a smooth and solid edge of the buttonhole or equivalent cut produced.

A more specific object of the invention is the provision of cutting apparatus of the referred to type adapted to afford a correct sequence of welding and cutting by means of a single operating step, to ensure both high efficiency and reliability of the cutting operations.

Yet another object of the invention is the provision of simple and efficient means to adapt the apparatus to the cutting of workpiece of varying thickness and/or different material.

The invention, both as to the foregoing and ancillary objects, as well as novel aspects thereof, will be better understood from the following detailed description of a preferred practical embodiment for the production of buttonholes in one or a number of superposed thermoplastic fabric workpieces, taken in conjunction with the accompanying drawing, forming part of this specification and in which:

FIG. 1 is a vertical sectional view of a cutting head or apparatus utilizing high-frequency heating for the welding and cutting and constructed in accordance with the principles of the invention;

FIG. 2 is a partial end view of the upper electrode member, taken on line II—II of FIG. 1;

FIG. 3 is a fragmentary cross-sectional view, to an enlarged scale, of the electrodes, the cutter and the workpiece, shown at the termination of a welding and cutting operation; and FIG. 4 is a perspective view of the upper electrode or cutting head according to the preceding figures.

Like reference numerals denote like parts in the differential views of the drawing.

With the foregoing objects in view, the improved cutting device and method, according to one aspect of the invention, comprises essentially a first tool member having a first surface for the positioning thereon of a fabric workpiece to be cut, and a second cooperating tool member having a second surface and operable between a retracted position and a position of contact of said second surface with said first surface or the workpiece, respectively. The surface of said second member has a shape delineating an oblong or strip-like contact area conforming to a zone of predetermining width adjoining the sides and ends of the buttonhole or the like cut to be produced in the workpiece. The cutting device or knife proper is slidably mounted within said second member centrally of and in line with said area, to variably project beyond said second surface to a maximum distance determined by a suitable, preferably adjustable, stop upon said second member limiting the outward movement of said knife. Finally, the knife is normally urged to a position of maximum projection from said second surface, determined by said stop, by the provision of suitable resilient energy storing means, in the form of a compression spring or the like, intervening between the knife or a separate holder thereof, on the one hand, and the first member or cutting head, on the other hand.

By utilizing said first and second members as electrodes connected to a suitable source of high-frequency energy, the thermoplastic fabric material of said area, upon said second member engaging the workpiece during operation towards said first member, will be softened or raised to plastic temperature by dielectric heating of the material, whereby to result in a welding of the thermoplastic fibres over an area enclosing and surrounding the cut (buttonhole) to be produced in the workpiece. Furthermore, during the operation of the first member towards the second member, the knife normally projecting beyond the surface of the second member is retracted to a position flush with said surface as a result of the relatively high resistance of the plastic material in the cold condition, thereby stressing or compressing said resilient means and storing threin a definite amount of elastic potential energy. Upon the material subsequently assuming an adequate degree of softness during heating in the end position of said first member or electrode, the ensuing reduced resistance of the plastic causes the knife to penetrate and to cut the material by release of the energy stored in said resilient means returning to its normal expanded position.

It can be seen from the foregoing that a single operating step or power application, i.e. the operation of the second member towards the first member, results in the simultaneous retraction of the cutting knife to a position preparatory to the starting of a cutting operation and the storage of an adequate amount of potential (resilient) energy, whereupon heating of the fabric in turn results in an increasing degree of softness until reaching the plastic state of the material, to effect both welding of the fibers and final cutting of the localized welded area by said knife by release of the energy stored in said resilient means.

As can be seen, the storage of definite or measured amounts of energy for each welding and cutting operation, provided a proper control of the dielectric heating field, will result in a cut (buttonhole) of high uniformity and strength, substantially without failures or rejects.

The invention may be used for the cutting of both single or superposed fabric layers or workpieces. In the latter case, the workpieces will be welded together at the area surrounding the cut or buttonhole, to result in a cut with reinforced edges, as will be understood. Furthermore, the invention applies with equal advantage to the cutting of fabrics consisting exclusively or in part of thermoplastic fibers. In the latter case, the thermoplastic fibers will be merged or welded in the manner pointed out, while the non-thermoplastic fibers will be cut mechanically by the knife or cutter, as will be understood.

The energy stored by the resilient means, or the maximum projecting distance of the cutting knife, may be controlled simply by the adjustment of the stop means, to adapt the device for the cutting of workpieces of varying thickness, while a suitable pre-biasing of the resilient means makes it possible to cut fabrics of different material, in a manner as will become further apparent as the description proceeds in reference to the drawing.

While in the following the invention will be described with specific reference to the production of buttonholes in thermoplastic fabric workpieces, it will be understood that the improved cutting device and method of the invention is capable of general use and application in the cutting of and processing of materials of this type.

Referring to the drawing, the numeral 10 denotes a hydraulically, pneumatically or otherwise operated reciprocable pressure applying member to which may be affixed a multiplicity of supporting plates 12 spaced by distances corresponding to a row of buttonholes to be produced simultaneously in a garment or fabric workpiece, only one of said plates and the associated cutting head being shown for simplicity and described in the following.

Secured, by means of countersunk screws 13 or the like, to the plate 12 is a movable hollow or sleeve-like electrode holder 15 integral with or having secured thereto a first electrode 14, parts 12–15 constituting the movable tool member of the cutting device cooperating with a stationary member or electrode in the form of a fixed support or anvil 25 carrying the stationary electrode 26 which serves as a support for a workpiece 30 to be cut. In the example shown, the lower end surface or cross-section of the movable electrode 14 has a shape or configuration corresponding to a zone or strip-like areas of predetermined width surrounding the sides and ends of the cut (buttonhole) to be produced in the workpiece 30 positioned upon the electrode 26 forming a support or working surface. More specifically, the end surface of the electrode 14 in the case of cutting buttonholes, as shown by the drawing, is comprised of a pair of strip-like parallel and spaced portions connected by rounded or semi-circular end portions, as shown more clearly by FIG. 2.

Slidably mounted within the member 15 is a cutting knife holder 16 forming a piston to which is secured the cutting knife 17 serving both as an electrode, in conjunction with the electrode 14, and as a severing element, in the manner described in further detail hereafter. The knife 17 is normally urged in the outward (downward) direction by the provision of a suitable resilient energy storing means or device 20 consisting, in the example shown, of a stack of dished spring elements 18 engaging the inner end surface of the piston 16, on the one hand, and an adjustable threaded plug or abutment member 22 mounted in the supporting plate 12, on the other hand. Any equivalent resilient energy storing means, such as a coiled compression spring being suitably biased by the plug 22, or an equivalent device, may be utilized for the purpose of the invention, as will be understood.

As a consequence, the spring 20 normally urges the knife 17 to a position of its cutting edge projecting by a predetermined distance beyond the end surface of the electrode 14, as shown in the drawing, the projecting distance of the knife being determined and adjustable by the aid of a pair of set screws 21 mounted in the wall of the member 15 and acting as an abutment to limit the downward movement of the piston 16. In other words, adjustment of the stops 21 determines the depth of penetration of the knife into the workpiece, as described in greater detail hereafter, making it possible thereby to adapt the device for the cutting of workpieces of different thickness.

The plug 22, serving as upper abutment of the spring 20, is provided with a number of angularly spaced radial bores 23 and a sector-shaped recess or cut-out 24, FIG. 2, to afford a control of the normal compression or bias of the spring 20 by adjusting or rotating the plug 22 by the aid of a pin or rod (not shown) inserted into one of the bores 23, in a manner readily understood. This, in turn, enables the control of the energy stored by the spring or equivalent resilient member, to adapt the device to the cutting of fabrics of different composition or material.

In order to insulate the workpiece 30 from the electrode or anvil 26, the latter may be covered with an insulating layer or sheet 27 (see also FIG. 3). In the example illustrated, in order to heat the workpiece 30 at the area to be welded and cut upon the electrode 14 being sufficiently approached towards the electrode 26, a high-frequency heating field is established between said electrodes by connecting the same to a suitable source 28 of high-frequency energy, to raise the temperature to the softening point of the plastic, in a manner well known.

In operation, with a fabric workpiece 30 being suitably positioned upon the electrode 26 in the manner shown, as the power applying member 10 is moved in the downward direction by a hand, pneumatic or the like press, the knife 17, normally projecting to a certain distance from the end surface of the electrode, will be retracted upon engaging the fabric into the electrode 14 or forced in the upward direction due to the relatively high mechanical resistance offered by the plastic material in the normal or cold condition, being in excess of the force exerted by the spring 20. This operation continues until the electrode 14 engages the fabric 30 at which time the edge of the knife 17 will be flush with the end surface of said electrode and the spring 20 has been compressed to store a predetermined amount of resilient or elastic potential energy. At the same time, the electrodes 14 and 26 have been approached to an extent to cause adequate high-frequency heating of the fabric over the electrode area, to raise the temperature thereof to a point sufficient to effect welding of the fibres and to produce a solid welded area or zone corresponding to the end surface of the electrode.

At the same time, that is, while the material underneath the knife 17 is still in its plastic state, the force exerted by the spring 20 exceeds the resistance offered by the material in the soft state, to thereby result in the cutting of the welded area by the released energy of the spring 20. Due to the cutting of a previously welded or homogeneous area of the fabric or workpiece by the knife 17, a cut (buttonhole) with smooth solid edges is obtained. Besides, due to the electric leakage flux produced as a result of the wedge-shaped knife edge, the resultant inner oblique faces of the buttonhole, FIG. 3, form a smooth or clean surface.

While a single fabric workpiece 30 may be welded and cut in the manner described, a pair or greater number of superposed workpieces or layers 30a and 30b, FIG. 3, may be cut in the same manner, whereby both the layers 30a and 30b, such as the folded edge of a garment, will be welded together, to produce a buttonhole of added mechanical strength, as will be understood.

The fabric 30 may consist of thermoplastic synthetic fibers throughout, or alternatively may be comprised in part of thermoplastic and in part of non-thermoplastic fibers (cotton, linen, etc.) in which case the former will be welded and cut in the manner described, while the non-thermoplastic fibres will be severed mechanically by the knife during cutting.

There is thus provided by the invention a device and method for the cutting of thermoplastic fabric workpieces comprising essentially the operation of a cutting knife into contact with a workpiece to be cut, the storing of a predetermined amount of resilient potential energy operative upon said knife and having a magnitude to effect cutting of the workpiece in the plastic condition of the fibres but insufficient to effect cutting while the workpiece or the fibres are in the cold state or at room temperature, and finally the raising of the workpiece to the plastic temperature of the fibres at a limited strip-like area surrounding the cut (buttonhole) to be produced, whereby to cause welding of the fibres at said area into a solid mass and subsequent cutting thereof at the welded area by spontaneous release of the stored energy.

In the foregoing, the invention has been described in reference to a specific illustrative device. It will be evident, however, that variations and modifications, as well as the substitution of equivalent parts and elements for those shown herein for illustration, may be made without departing from the broader scope and spirit and the invention as set forth in the appended claims. The specification and drawing are accordingly to be regarded in an illustrative rather than in a restrictive sense.

We claim:
1. Apparatus for the cutting of fabric workpieces composed at least in part of thermoplastic fibres comprising in combination:
   (1) a first electrode member having a first surface,
   (2) a second electrode member having a second surface and operable between a retracted position and a position of contact of said second surface with a workpiece positioned upon said first surface,
   (3) said second surface delineating a strip-like contact area conforming to a zone of predetermined width adjoining the cut to be produced in said workpiece,
   (4) a cutting knife slidably mounted within said second electrode member centrally of and in line with said area,
   (5) stop means upon said second member, to limit the projection of said knife beyond said second surface,
   (6) resilient means intervening between said knife and said second member, to normally urge said knife to a position of projection from said second surface determined by said stop means, and
   (7) means to establish a high-frequency heating field between said first and second electrode members, whereby retraction of said knife to a position flush with said second surface against the action of said resilient means, upon operation of said second member into engagement with the workpiece, will result in the heating and plastic welding of the fabric fibres over said area and subsequent cutting of the material of the welded area while still in the plastic state by said knife by energy stored in said resilient means.

2. In cutting apparatus as claimed in claim 1, including adjusting means to vary the position of said stop means relative to said second member, to adapt said apparatus to the cutting of workpieces of varying thickness.

3. In cutting apparatus as claimed in claim 1, including adjusting means to control the normal biasing force on said resilient means.

4. In cutting apparatus as claimed in claim 1 adapted for the cutting of buttonholes and the like, wherein said second electrode member has a cross-section comprising two spaced and parallel oblong strip-like portions connected by rounded end portions, to conform with a narrow zone surrounding the buttonhole to be cut, said knife having an edge parallel to and being slidably mounted between the strip-like portions of said member.

5. In cutting apparatus as claimed in claim 1, said second electrode member forming part of a first holder arranged for operation towards and away from said first member and a second holder for said knife slidable within said first holder, said resilient means consisting of a compression spring engaging said second holder and said first member, respectively.

6. In cutting apparatus as claimed in claim 5, including set screw means mounted in said second member, to engage the inner end of said spring, to adjust the normal compression of the spring.

7. Apparatus for the cutting of fabric workpieces composed at least in part of thermoplastic fibres comprising in combination:
   (1) a first member having a first surface,
   (2) a second member having a second surface and operable between a retracted position and a position of contact of said second surface with a workpiece positioned upon said first surface,
   (3) said second surface delineating a strip-line contact area conforming to a zone of predetermined width adjoining the cut to be produced in said workpiece,
   (4) a cutting knife slidably mounted within said second member centrally of and in line with said area,
   (5) stop means upon said second member to limit the projection of said knife beyond said second surface,
   (6) resilient means intervening between said knife and said second member, to normally urge said knife to a position of projection from said second surface determined by said stop means, and to stress said resilient means by retraction of said knife to a position flush with said second surface upon operation of said second member into engagement with said workpiece, and
   (7) means to heat said workpiece at said area upon said second member engaging the workpiece, whereby to result in the plastic welding of the fabric fibres over said area and subsequent cutting of the welded area by said knife by the energy stored by said resilient means.

References Cited

UNITED STATES PATENTS

| 35,163 | 5/1962 | Loewenberg | 156—253 |
| 2,414,157 | 1/1947 | Marziani | 156—513 |
| 3,263,290 | 8/1966 | Eguchi et al. | 112—264 |

FOREIGN PATENTS

| 629,474 | 8/1949 | Great Britain. |

D. J. DRUMMOND, *Primary Examiner.*

U.S. Cl. X.R.

112—264; 156—513